United States Patent [19]

Mooney

[11] 4,051,716
[45] Oct. 4, 1977

[54] LEAK DETECTOR

[76] Inventor: Joseph R. Mooney, 33 Hawk St., New Orleans, La. 70124

[21] Appl. No.: 730,767

[22] Filed: Oct. 8, 1976

[51] Int. Cl.² .................. G01M 3/04; F17D 3/04
[52] U.S. Cl. ................................................ 73/40.5 R
[58] Field of Search .............................. 73/40, 40.5 R

[56] References Cited

U.S. PATENT DOCUMENTS 3,788,127   1/1974   Marsh ..................................... 73/40
3,817,087   6/1974   Mooney .......................... 73/40.5 R Primary Examiner—Richard C. Queisser
Assistant Examiner—Joseph W. Roskos
Attorney, Agent, or Firm—James B. Lake, Jr.

[57] ABSTRACT

In a leak detector of the by-pass check-valve type, as described in my U.S. Pat. No. 3,817,087, having a check-valve blocking lever that is pivotal by a leak flow through the by-pass, the leak flow being directed against the blocking lever through a nozzle mounted in slidable cooperation with a sleeve for concentrating the force of the leak flow and for following the blocking lever as it is pivoted thereby, thus maintaining the maximum force thereagainst, and thereby indicating a leak by restricting the opening of the check-valve and normal flow therethrough.

5 Claims, 5 Drawing Figures

LEAK DETECTOR

BACKGROUND OF THE INVENTION

The invention relates generally to the direction of leaks in a fluid pressure line, and more particularly to apparatus for detecting leaks by restricting a normal flow of fluid in said pressure line.

The invention is an improvement of my prior invention of apparatus for detecting and indicating leaks in a fluid system, for which U.S. Pat. No. 3,817,087 was issued.

SUMMARY OF THE INVENTION

An object of the invention is to provide apparatus for increasing the force of a leak flow to actuate blocking means to reduce a normal flow of fluid through fluid pressure lines.

Other objects and a full understanding of the invention may be obtained by referring to the following specifications and drawings.

DESCRIPTION OF THE INVENTION

Figure 1:
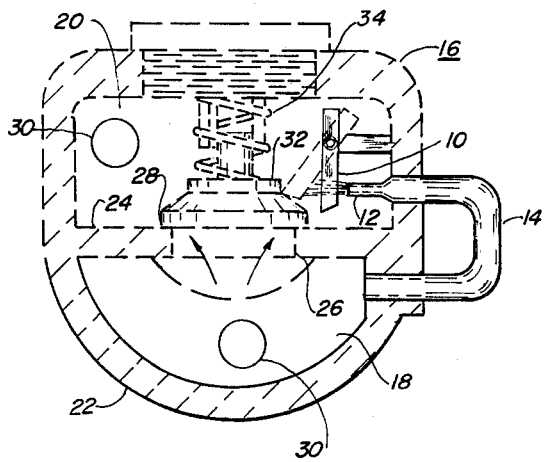
FIG. 1 is a side elevation of a transverse sectional view of the invention in operative position in a poppet valve connected in a fluid pressure line.
Figure 2:
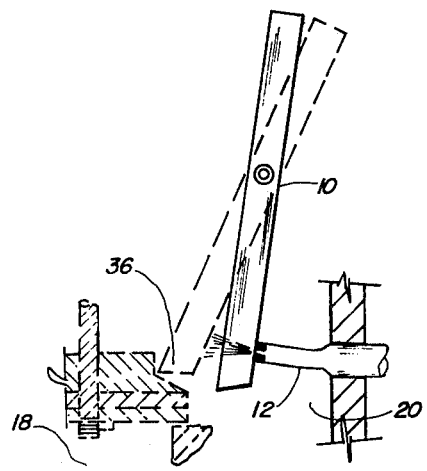
FIG. 2 is an enlarged partial view of FIG. 1 of the invention.

Referring to FIGS. 1-2 the invention comprises a blocking-lever 10 mounted opposite a discharge nozzle 12 of a by-pass 14 mounted on a one-way poppet valve 16. By-pass 14 connects interior upstream and downstream spaces 18 and 20, respectively, that are defined in poppet valve 16 by exterior walls 22 and interior wall 24 in which is defined a connecting hole 26 and valve seat 28. Poppet valve 16 is connected in a pressure fluid line 30. A valve 32 is mounted in valve seat 28 and biased closed by a spring 34 when upstream pressure of the fluid pressure line 30 is less than the combined pressure of spring 34 and the downstream pressure of the fluid pressure line 30.

In operation, blocking lever 10 is adapted to pivot an end 36 over valve 32 to restrict the movement of the valve off its seat 28 and thus restrict the flow of pressure fluid through connecting hole 26 and poppet valve 16 when a downstream leak in the fluid pressure line causes a leakage flow through by-pass 14. Nozzle 12 directs leakage flow with increased force against lever 10.

Figure 3:
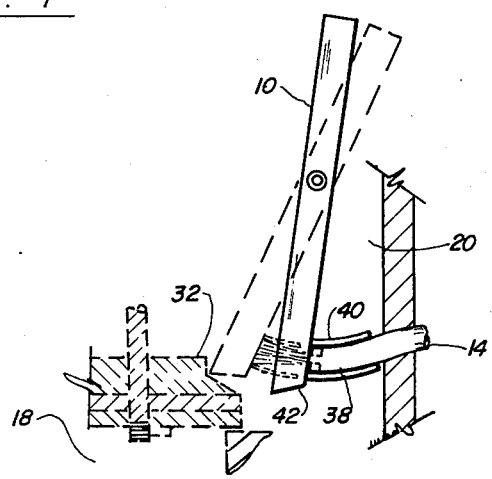
FIG. 3 is similar to FIG. 2 showing a second specie of the invention.

FIG. 3 shows a curved discharge end 38 of by-pass 14 that slidably engages in a curved sleeve 40 fixed to an end 42 of blocking lever 10 for concentrating the leakage flow from nozzle 12 and thus further augmenting the force of the flow to actuate blocking lever 10 in a second specie of the invention.

Figure 4:
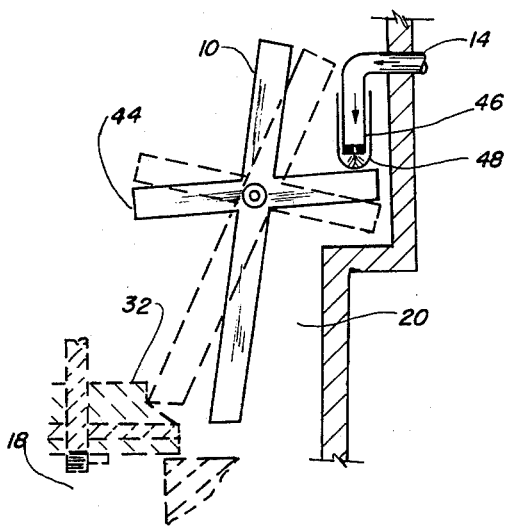
FIGS. 4–5 are similar to FIGS. 2 and 3 and show third and fourth species of the invention.

FIG. 4 illustrates a third specie of the invention wherein a cross member 44 is added to blocking lever 10 and the discharge end 46 of by-pass 14 is slidably sleeved for a closed end 48 thereof to engage cross member 44 to operably pivot blocking lever 10 into blocking position.

Figure 5:
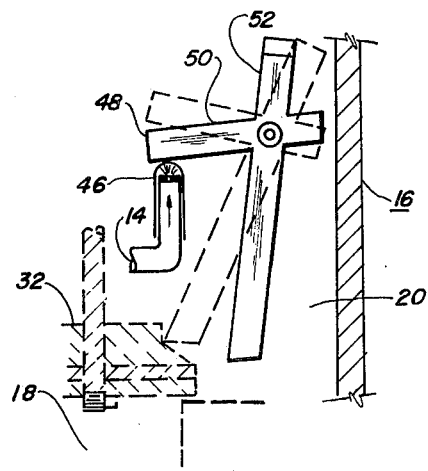

FIG. 5 illustrates the fourth specie of the invention in which the direction of discharge end 46 of by-pass 14 is reversed as is the slidably sleeved engagement of a closed end 48 with a cross member 50. An end of cross member 50 and a blocking lever 52 required shortening because of space and are counterweighted to offset the assymmetry.

When no leaks develope between poppet valve 16 and down-stream, there is no leakage flow and the blocking lever of all species is pivoted clear of valve 32 by gravity as shown in FIGS. 1–5.

What is claimed is:

1. In a poppet valve for connection in a fluid pressure line to detect any leakage downstream therefrom, said poppet valve defining up and down stream spaces connected by a valve seat, spring biased closed by a valve mounted to seat therein, and by a bypass of said valve seat, a leak detector comprising:
   a. a nozzle defined on the downstream end of said bypass for directing and accelerating a bypass leakage flow; and
   b. a blocking lever pivoted in said downstream space with an end opposite said nozzle and adjacent the valve and valve seat, said blocking lever being adapted to be pivoted by said leakage flow from said nozzle to swing an end over the seated valve and limit its displacement from the valve seat and thereby limit a normal pressure fluid flow through the poppet valve to signal the presence of a leak.

2. A leak detector as described in claim 1 wherein said nozzle end of the bypass is curved, and a sleeve, similarly curved, is mounted on the end of the blocking lever to slidably receive said nozzle end and form an extensible passageway for, and to concentrate, leakage flow against the end of said blocking lever to pivot it and block said poppet valve for the better detection of small leaks.

3. A leak detector as described in claim 1 wherein said nozzle has a sleeve slidably mounted thereon for concentrating a flow of any nozzle leakage, said sleeve having a rounded closed end for engaging and following the end of said blocking lever and for preventing the escape of said leakage to augment the force of said leakage flow to swing the end of the blocking lever.

4. A blocking lever, nozzle and sleeve as described in claim 3 wherein said blocking lever has a cross member and said nozzle and sleeve are adapted to engage said cross member for swinging the blocking lever.

5. A blocking lever as described in claim 4 wherein the ends of said lever and cross member are asymmetrical and their respective short ends are counterweighted to weigh the same as the longer ends.

* * * * *